United States Patent
Murillo, Jr. et al.

(10) Patent No.: US 9,628,424 B2
(45) Date of Patent: Apr. 18, 2017

(54) APPARATUS AND METHOD FOR SHARING TIME-SENSITIVE DATA BETWEEN DEVICES WITH INTERMITTENT CONNECTIVITY

(71) Applicant: Samsung Electronics Co. Ltd., Suwon-si, Gyeonggi-do (KR)

(72) Inventors: Roberto Luis Murillo, Jr., Blue Springs, MO (US); William James Confer, Clinton, NY (US)

(73) Assignee: Samsung Electronics Co., Ltd., Suwon-si (KR)

( * ) Notice: Subject to any disclaimer, the term of this patent is extended or adjusted under 35 U.S.C. 154(b) by 658 days.

(21) Appl. No.: 13/677,739

(22) Filed: Nov. 15, 2012

(65) Prior Publication Data

US 2014/0136633 A1    May 15, 2014

(51) Int. Cl.
H04L 12/58 (2006.01)

(52) U.S. Cl.
CPC ............ H04L 51/24 (2013.01); H04L 12/587 (2013.01)

(58) Field of Classification Search
CPC .............................. H04L 51/24; H04L 12/587
See application file for complete search history.

(56) References Cited

U.S. PATENT DOCUMENTS

| | | | |
|---|---|---|---|
| 2004/0158610 A1* | 8/2004 | Davis ................. | H04L 12/1831 709/206 |
| 2004/0162870 A1* | 8/2004 | Matsuzaki et al. ........... | 709/200 |
| 2008/0005358 A1* | 1/2008 | Kwon ....................... | H04L 7/00 709/248 |
| 2008/0032689 A1* | 2/2008 | Kubota ................... | H04L 12/66 455/425 |
| 2008/0077673 A1* | 3/2008 | Thomas ................ | H04L 12/587 709/206 |
| 2008/0085682 A1* | 4/2008 | Rao ..................... | H04M 1/7253 455/74 |
| 2008/0207184 A1* | 8/2008 | Wassingbo et al. .......... | 455/417 |
| 2008/0222711 A1* | 9/2008 | Michaelis .......... | G07C 9/00039 726/7 |
| 2008/0292074 A1* | 11/2008 | Boni ....................... | H04M 3/54 379/93.11 |
| 2008/0301779 A1* | 12/2008 | Garg et al. ........................ | 726/4 |
| 2009/0151006 A1* | 6/2009 | Saeki et al. ..................... | 726/28 |
| 2009/0177794 A1* | 7/2009 | Alexander et al. ........... | 709/237 |
| 2010/0215036 A1* | 8/2010 | Eom et al. ..................... | 370/352 |
| 2010/0304719 A1* | 12/2010 | Deep ..................... | H04M 3/02 455/413 |
| 2011/0195699 A1* | 8/2011 | Tadayon et al. .............. | 455/418 |
| 2012/0115451 A1* | 5/2012 | Roka ....................... | H04M 3/42 455/417 |
| 2012/0136942 A1* | 5/2012 | Amidon ................ | H04W 76/02 709/206 |

(Continued)

*Primary Examiner* — Dustin Nguyen
*Assistant Examiner* — Juan C Turriate Gastulo
(74) *Attorney, Agent, or Firm* — Jefferson IP Law, LLP

(57) ABSTRACT

An apparatus and method for sharing time-sensitive data between devices are provided. The apparatus includes a communication unit for communicating with other devices, a display unit for displaying a notification of a network event originating from another device, and a controller for, when the communication unit receives a first notification message about the network event from the other device, controlling the display unit to present the notification to the user.

21 Claims, 3 Drawing Sheets

(56) References Cited

U.S. PATENT DOCUMENTS

| | | | |
|---|---|---|---|
| 2012/0214531 A1* | 8/2012 | Mao | H04W 68/02 |
| | | | 455/517 |
| 2013/0241918 A1* | 9/2013 | Satyan | G06F 9/542 |
| | | | 345/418 |
| 2013/0316744 A1* | 11/2013 | Newham et al. | 455/458 |

* cited by examiner

APPARATUS AND METHOD FOR SHARING TIME-SENSITIVE DATA BETWEEN DEVICES WITH INTERMITTENT CONNECTIVITY

BACKGROUND OF THE INVENTION

1. Field of the Invention

The present invention relates to an apparatus and method for sharing time-sensitive data. More particularly, the present invention relates to an apparatus and method for sharing time-sensitive data between devices with intermittent connectivity.

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

In a similar vein, features previously associated only with computers have expanded to other devices. For example, televisions and set-top boxes (including video game consoles, cable boxes, and the like) now offer a variety of features beyond their original functionality, including streaming content and Internet access (e.g., web browsing). In addition, tablets, such as the Apple™ iPad™ and Samsung™ Galaxy Tab™, have exploded in popularity in recent years.

As a result, many homes include a variety of devices, including mobile phones, desktop computers, laptop computers, and tablets. Each of these devices has their own mechanisms for alerting users of important events. For example, a mobile phone includes various notifications to inform a user of an incoming telephone call or text message. Tablets and desktop computers have their own mechanisms of notifying users of incoming messages or other events.

However, these devices do not broadcast these notifications to other devices. For example, when the mobile phone receives a telephone call, the mobile phone does not transmit this notification to another device, such as a tablet or television. If the user is watching television and does not hear the notification because the mobile phone is in another room or is set to silent mode, the user will not be able to answer the call, even though the user may wish to answer. Accordingly, there is a need for an apparatus and method for providing notifications among multiple intermittently connected devices.

SUMMARY OF THE INVENTION

Aspects of the present invention are to address at least the above-mentioned problems and/or disadvantages and to provide at least the advantages described below. Accordingly, an aspect of the present invention is to provide an apparatus and method for sharing notifications between devices with intermittent connectivity.

In accordance with an aspect of the present invention, an apparatus for sharing time-sensitive data between devices is provided. The apparatus includes a communication unit for communicating with other devices, a display unit for displaying a notification of a network event originating from another device, and a controller for, when the communication unit receives a first notification message about the network event from the other device, controlling the display unit to present the notification to the user.

In accordance with another aspect of the present invention, a method for sharing data between devices is provided. The method includes receiving, by an apparatus, a first notification message about a network event from one of a plurality of devices included in a list of trusted devices, and displaying the notification on a display of the apparatus.

In accordance with another aspect of the present invention, a server is provided. The server includes a communication unit for receiving registration requests and notification messages about network events from other devices, and a registration unit for receiving a registration request from the communication unit, for adding a device indicated in the registration request to a trusted list of devices, and for transmitting an updated trusted list to the other devices.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
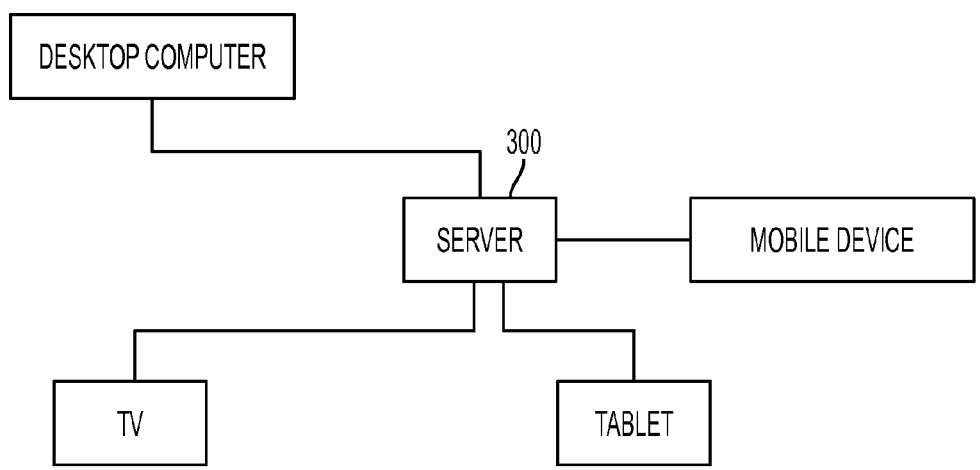
FIG. 1 illustrates a network of devices according to an exemplary embodiment of the present invention.

FIG. 1 illustrates a variety of devices according to an exemplary embodiment of the present invention.

Referring to FIG. 1, the devices may include a server 300, a mobile device, a tablet, a television, and a desktop computer. The devices may be connected by a variety of networks. For example, the television and the server 300 could be connected via a home networking technology such as Universal Plug and Play (UPnP) or Home Audio Video interoperability (HAVi). The server 300, desktop computer, and television could be part of a Local Area Network (LAN) over Ethernet or wireless. The tablet and the mobile device may only be intermittently connected to the other devices, due to their mobile nature. Accordingly, while the devices in FIG. 1 are shown as all connected to the server 300, it would be understood that this illustration is merely exemplary, and one or more devices need not be connected to the server 300.

Each device stores a list of trusted devices in the network. A trusted device in this context denotes a device which will receive notification messages about network events from other devices on the list. In the network of FIG. 1, the user's mobile device would be a trusted device that would transmit network events (such as an incoming phone call) to the television, but a friend's mobile device would not be a trusted device. If the user invited the friend over to watch a football game, for example, the user could be notified of incoming calls via the television, but the friend, whose mobile device is not a trusted device, would not.

Whenever a network event occurs, the device where the network event originated forwards a notification message to all other active and accessible devices on the trusted list. For example, when the mobile device receives a call while the desktop and tablet are in a sleep state, the mobile device may forward the notification to the television only. Alternatively, the mobile device may forward the notification to every accessible device on the trusted list, but only those devices in an active state (i.e., powered on or wake state) would act on the notification.

An accessible device may be any device to which the originating device (i.e., the device generating the network event) is able to transmit the notification message. For example, a mobile phone may be able to access the server 300 via Wi-Fi and a tablet via Bluetooth, but may not be able to access a desktop computer. In this case, the server 300 and the tablet would be devices accessible from the mobile phone.

While the network shown in FIG. 1 includes a server 300 that manages registration of devices in a network, according to another exemplary embodiment of the present invention the server 300 may be omitted, and registration of devices for network events may be handled in a decentralized manner, in which each device may register another device and transmit updated trusted lists to the other devices.

Figure 2:
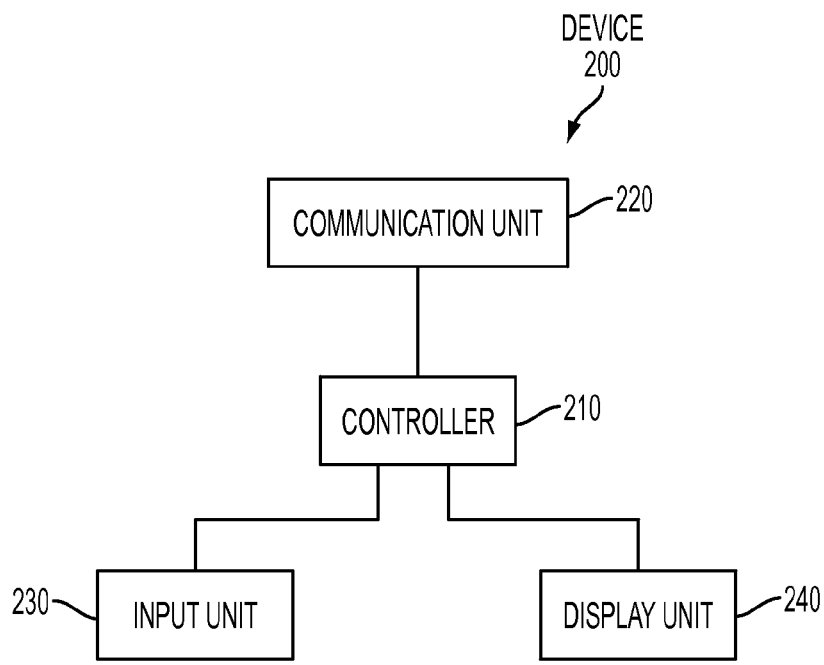
FIG. 2 illustrates a device according to an exemplary embodiment of the present invention.

FIG. 2 illustrates a device according to an exemplary embodiment of the present invention.

Referring to FIG. 2, a device 200 includes a controller 210, a communication unit 220, an input unit 230, and a display unit 140. The device 200 may be any of a variety of devices, including portable devices (such as mobile phones, tablets, or laptops) or non-portable devices (such as televisions, set-top boxes, or desktop computers). It would therefore be understood that the device 200 may include additional components not shown here. These components may vary according to the function and purpose of the device 200.

The controller 210 controls overall operations of the device 200. The controller 210 receives, from the server 300, a list of trusted devices that have been registered with the server 300. In a similar fashion, when the user wishes to register the device 200 with the server 300 as a trusted device, the controller 210 controls the communication unit 220 to transmit registration information to the server 300. In response to the registration, the server 300 may transmit a list of trusted devices to the device 200, which the controller 210 stores in a storage unit (not shown). In addition, the controller 210 may also receive an updated trusted list from the server 300. The updates may be received on a regular (periodic) basis or may be received when a change in the list occurs (i.e., a device is added to or removed from the list).

When the communication unit 220 receives a notification message from another device, the controller 210 determines whether the notification should be presented to the user. For example, if the device 200 is in a sleep state, the controller 210 may determine not to present the notification to the user. Similarly, if the device 200 is in a state in which notifications are not displayed, such as a vibrate mode, the controller 210 may also determine not to present the notification to the user. Alternatively, in this scenario, the controller 210 may determine to present the notification in manner appropriate to a current mode (such as by vibrating the device 200 if the device 200 is operating in the vibrate mode).

The notification message may include a request to forward the notification message to other devices. This may occur when the device initially transmitting the notification message cannot send the notification message directly to other devices. This situation may occur when, for example, the originating device is connected to some devices via Bluetooth and would like the notification message to be transmitted to other devices in a local network (e.g. Ethernet or Wi-Fi). In this case, the controller 210 may forward the notification message to other devices instead of, or in addition to, displaying the notification to the user. In addition, the controller 210 may disregard the notification message if the controller 210 determines that the notification message is a duplicate of a previously received notification message. This determination may be made based on information contained in the notification message, such as a message ID.

How the controller 210 responds to notifications may be controlled according to a user setting. In addition, the user may also specify certain types of network events for which the device 200 should not display notifications. In this case, when a notification message corresponding to an excluded type of network event is received, the controller 210 ignores the notification message and does not display a notification on the display unit 240.

In a similar vein, when a network event is generated in the device 200, the controller 210 determines whether the network event should be communicated to other devices. This determination may be made according to a user setting or the state of the device 200. For example, the user may indicate that a particular network event (such as a phone call from a specified individual) should always be forwarded to the other devices on the trusted list. Alternatively, the controller 210 may forward notification messages when the user is not actively monitoring the device, such as when the device 200 is in a sleep state or no input has been received via the input unit 230 for a predetermined period of time. When the controller 210 determines that a notification message should be sent, the controller 210 controls the communication unit 220 to transmit a notification message to the active and/or accessible devices on the trusted list. The devices to which the notification messages to be sent may further be determined according to information contained in the trusted list.

Network events include any event generated by or received at the device 200. Different devices may generate different network events, which represent an item or event of interest to the user. A network event could be a telephone call or message (such as a text message or E-mail) received at a device. Other network events include notifications from online services (such as social networks) or calendar events (such as an appointment or reminder for a scheduled television program). What network events will generate notifications may be set by the user. For example, the user may specify that only telephone calls from certain specified parties may result in the generation of a network event, or that only certain upcoming television programs will result in a network event.

The input unit 230 receives input from the user of the device 200. The input unit 230 may include a plurality of keys, a trackpad, or a mouse. The particular design and appearance of the input unit 230 may vary according to the design and functionality of the device 230. The input unit 230 may receive input to control how and when the device 200 generates and responds to network events.

The display unit 240 may be provided as a Liquid Crystal Display (LCD). In this case, the display unit 240 may include a controller for controlling the LCD, a video memory in which image data is stored and an LCD element. If the LCD is provided as a touch screen, the display unit 240 may perform a part or all of the functions of the input unit 240.

The display unit 240 displays a user interface to allow the user to define which network events generated by the device 200 are to be reported to other devices, and how network events from other devices should be displayed on the device 200. In addition, according to the user settings, the display unit 240 may display notifications related to network events received from other devices, depending on the user settings. Finally, the display unit may also display a user interface to enable the user to register the device 200 with the server 300 so as to communicate information about network events to other devices.

Figure 3:
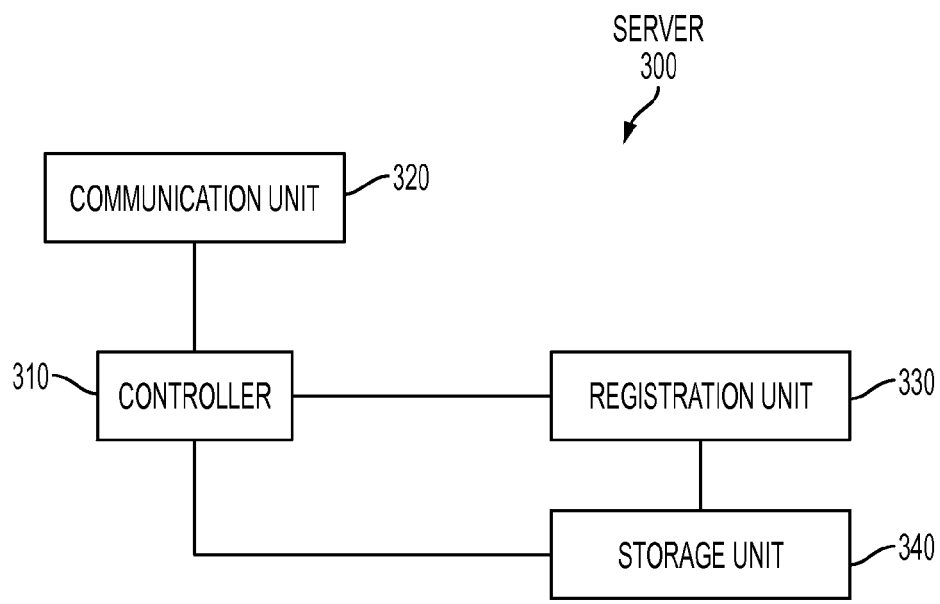
FIG. 3 illustrates a server according to exemplary embodiments of the present invention.

FIG. 3 illustrates a server according to exemplary embodiments of the present invention.

Referring to FIG. 3, the server 300 includes a controller 310, a communication unit 320, a registration unit 330, and a storage unit 340. As with the device 200, the server 300 may include additional components not shown in FIG. 3. In addition, the server 300 may be incorporated within any device of the network. For example, in the network of FIG. 1, the server 300 could be incorporated into the desktop computer, instead of being a separate device. The server 300 could also be incorporated into a wireless router or the like.

The communication unit 320 receives communications from other devices in the network. These communications may include registration requests from other devices and notification messages about network events. The communication unit 320 also broadcasts updated trusted lists to the other devices in the network.

The communication unit 320 is configured to include an RF transmitter (not shown) for up-converting the frequency of transmitted signals and amplifying the transmitted signals, and an RF receiver (not shown) for low-noise amplifying of received RF signals and down-converting the frequency of the received RF signals.

The controller 310 controls the overall operations of the server 300. When a registration request is received from a device via the communication unit 320, the controller 310 controls the registration unit 330 to handle the registration of the device, as described below. Similarly, the controller 310 also controls the communication unit 320 to transmit updated trusted lists to the other devices.

The registration unit 330 handles registration of devices. When a device requests registration on the trusted list, the registration unit 330 first determines whether the device should be registered. In some cases any device requesting registration may be registered on the trusted list. In other cases, the registration unit 330 may request authentication data or other permission prior to registering the device. The authentication data may be, for example, a password, and may be included in the initial registration request.

When the registration unit 330 determines that the device is to be registered, the registration unit 330 updates the trusted list and stores the trusted list in the storage unit 340. The trusted list may include not only devices to which network events are to be sent, but also information about network events that are to be sent to that device. The trusted list may also include a unique ID for each device and/or address information for each device. The unique ID may be the same as the address information or may be different. The unique ID may be defined by a user (for example in a human-readable format such as 'John's mobile phone') or may be defined according to other information.

Accordingly, the trusted list may include information about types of network events that are (or are not) to be sent to the corresponding device, as well as information identifying devices that are to transmit notification messages about network events to the device 200. For example, a registration request from a mobile device may specify that notification messages about E-mail messages should not be sent to the mobile device, and that notification messages originating from a tablet and a television should be sent to the mobile device. This information may be included in the registration request transmitted to the server 300.

The registration unit 330 also transmits the updated trusted list to the other devices. This may occur periodically on a regular basis, or whenever the registration unit 330 updates the trusted list.

The functions of the server 300 may be centralized or decentralized. In the centralized operation, the server 300 receives all registration requests and transmits updated trusted lists to the other devices. The server 300 may also receive all notification messages about network events and forward the notifications to the other devices in the network. The server 300 may also forward only those notification messages to active devices that cannot be accessed by the originating device (such as when the originating device is on a different network). In this case, the server 300 may convert the notification message into a format suitable for the different network.

In decentralized operation, some or all of the functions of the registration unit 330 may be performed by other devices in the network. For example, the registration unit 330 may only receive registration requests, update the trusted list, and transmit the updated list to the other devices. The functions of the registration unit 330 may also be distributed among the other devices in the network, which may operate in a more peer-to-peer fashion. In this implementation, a device may transmit a request to another device in the network, which will update its trusted list accordingly and transmit the updated list to the other devices in the network. Similarly, a device may transmit a notification message about a network event to all active and/or accessible devices according to the information contained in the trusted list, instead of routing the notification through the server 300.

Figure 4:
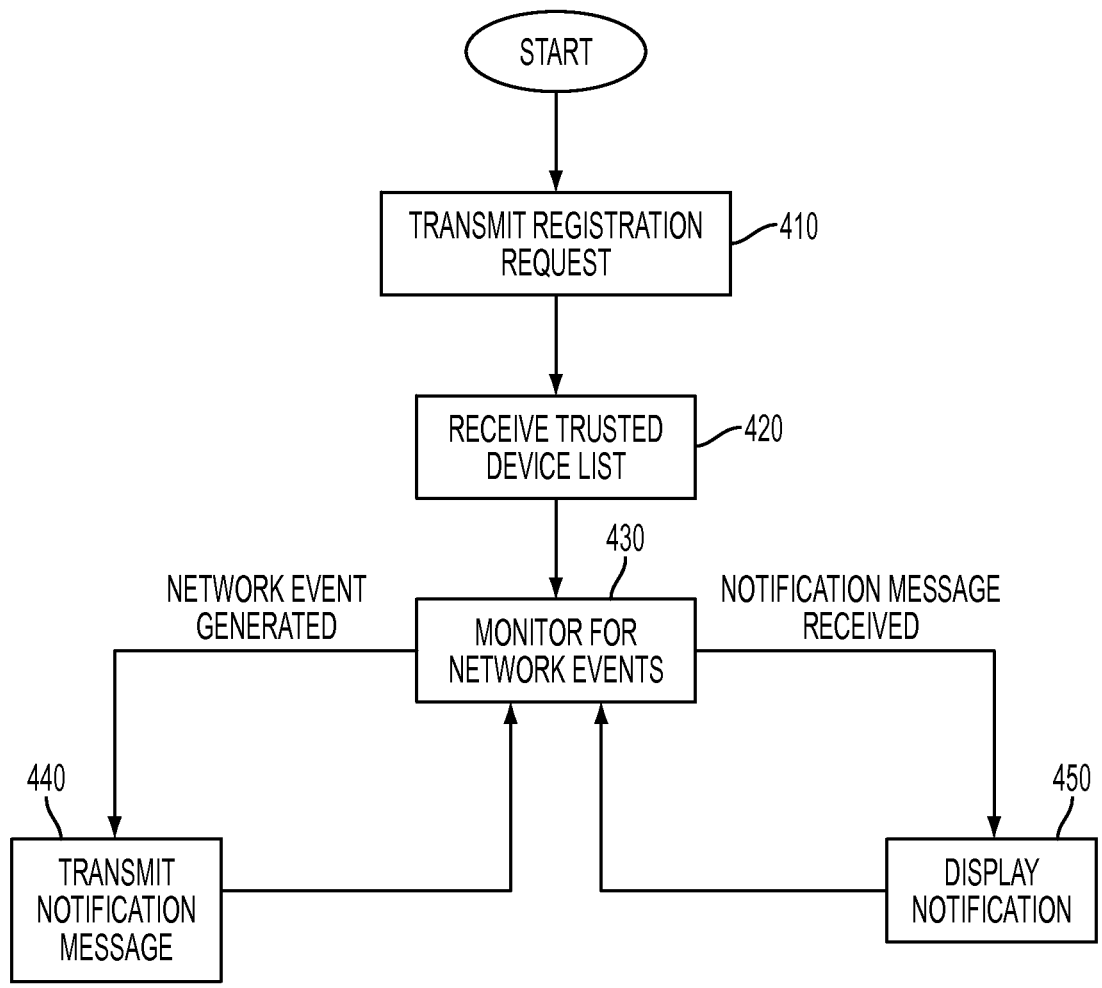
FIG. 4 is a flowchart of a method for sharing notifications between devices according to an exemplary embodiment of the present invention.

FIG. 4 is a flowchart of a method for sharing notifications between devices according to an exemplary embodiment of the present invention.

Referring to FIG. 4, the device 200 transmits a registration request to the server 300 in step 410. As described above, the device 200 may also transmit the registration request to another device. The registration request includes a unique ID of the device 200. This unique ID may be, for example, a hardware identifier such as a Media Access Control (MAC) address of the device 200, or an arbitrary ID, and may be set by the user. As described above, the registration request may also include information (e.g., unique ID or address information) about specific devices which should transmit notification messages to the device 200, and types of network events for which notification messages should (or should not) be sent to the device 200. The registration request may further include address information of the device 200 to allow other devices to transmit notification messages to the device 200.

In step 420, the device 200 receives the trusted list of devices from the server 300 (or other device). The trusted list may include the unique ID for each device, along with types of corresponding network events that are (or are not) to be sent to each device and address information. In this case, the trusted list may also include address information only for devices accessible to the device 200. For example, if the device 200 is operable on a Wi-Fi network, the trusted list received by the device 200 could include address information only for those devices that are accessible by the Wi-Fi network.

In step 430, the device 200 monitors for network events. This may include network events generated by the device or notification messages about network events received from other devices.

If a network event is generated by the device 200 (e.g., a telephone call is received by the device 200), then the device 200 transmits a notification message to other devices in the network that are active and/or accessible in step 440. Whether a notification message should be generated and transmitted may be determined according to a user setting in the device 200, as described above.

If a notification message is to be transmitted, the device 200 may transmit a notification message only to those devices that are interested in receiving notification messages, as indicated in the trusted list. Similarly, according to the type of the network event, the corresponding notification message may be sent only to devices interested in receiving notification messages for those types of network events, as defined in the trusted list.

If one or more devices are not accessible to the device 200 (perhaps because these devices are on a different network), the device 200 may transmit the notification message to the server 300 to be forwarded to other devices or may request the accessible devices to forward the notification message to other devices. In this case, the notification message may include a message identifier to ensure that the same device does not display multiple notifications for the same event. Alternatively, the device 200 may transmit the notification message only to those devices that are accessible and available.

The notification message may include the unique ID of the device, a type of the corresponding network event (e.g., incoming E-mail, telephone call, or scheduled television program), and/or additional information about the network event. This additional information may vary according to the particular network event. For example, if the network event is an incoming telephone call, the additional information may include the name and number of the calling party. Once the device 200 transmits the notification message, the device 200 returns to step 430 to continue monitoring for network events.

If the device 200 receives a notification message, the device 200 displays a notification to the user about the related network event in step 450. The notification may include information identifying the device generating the network event and information about the network event. This information may be extracted from the notification message and/or may be supplemented with additional information stored in the device 200.

As indicated above, the device 200 may display only certain notifications, which may be set according to user preferences. For example, the user may input a setting that E-mail notifications from a mobile device (or E-mail notifications regarding an E-mail from a particular sender) should not be displayed on the television. In this case, if the television receives a notification message about an incoming E-mail from the mobile device (or an incoming E-mail from the particular sender), information about the network event is not displayed on the television. The device 200 may also make an audio signal or vibrate to indicate the network event. Once the message is displayed, the device 200 returns to step 430 to continue monitoring for network events.

According to exemplary embodiments of the present invention, a user is able to receive notifications about network events occurring in other devices. This allows the user to know of network events even when the user is not actively using a particular device, and gives the user confidence that important events will not be missed.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for sharing time-sensitive data between devices, the apparatus comprising:
   a transceiver configured to communicate with a plurality of devices;
   a display configured to display information; and
   at least one processor configured to:
      when the transceiver receives a first notification message from a first device, determine whether the first notification message corresponds to a predetermined network event,
      when the first message does not correspond to the predetermined network event, perform a predetermined operation corresponding to the first notification message,
      when the first notification message corresponds to the predetermined network event, determine a current state of the apparatus and a current state of a second device configured to receive the first notification message from the apparatus, when the first notification message corresponds to the predetermined network event and the apparatus is determined to be in an active state, control the display to display a notification associated with the first notification message originating from the first device and transmit the first notification message received from the first device to the second device based on information included in the first notification message and the current state of the second device, and when the first notification message corresponds to the predetermined network event and the apparatus is determined to be in an inactive state, transmit the first notification message received from the first device to the second device based on information included in the first notification message and the current state of the second device, wherein the first device or the second device is at least one of a portable device, a mobile phone, a tablet, a laptop, a non-portable device, a television, a set-top box, or a desktop computer, wherein the predetermined network event is at least one of a telephone call, a data message, a text message, an e-mail message, a notification from an online service, a calendar event, an appointment, or a reminder, and wherein the predetermined network event is specified by a user.

2. The apparatus of claim 1, wherein, when a network event occurs at the apparatus, the at least one processor is further configured to control the transceiver to transmit a second notification message corresponding to the network event occurring at the apparatus to the other devices included in a trusted list of devices and accessible by the apparatus.

3. The apparatus of claim 2, wherein the first notification message includes at least one of:
a unique ID of the apparatus,
address information of the apparatus,
a type of the network event occurring in the apparatus, and
additional information about the network event occurring in the apparatus.

4. The apparatus of claim 3, wherein the at least one processor is further configured to control the display to present the notification at the apparatus according to information contained in the first notification message.

5. The apparatus of claim 2,
wherein the at least one processor is further configured to:
control the transceiver to transmit a registration request, and
wherein the transceiver receives the trusted list of devices in response to transmitting the registration request.

6. The apparatus of claim 5, wherein the registration request is transmitted to a server and the trusted list of devices is received from the server in response to the registration request.

7. The apparatus of claim 5, wherein the registration request includes at least one of:
a unique ID of the apparatus,
address information of the apparatus,
types of network events for which corresponding messages are or are not to be transmitted to the apparatus, and
information about devices from which notification messages should be transmitted to the apparatus.

8. The apparatus of claim 2, wherein the trusted list of devices includes, for each device in the trusted list, at least one of:
a unique ID of that device,
address information of that device,
types of network events for which corresponding notification messages are or are not to be transmitted to that device, and
devices which should transmit notification messages to that device.

9. The apparatus of claim 8, wherein the at least one processor is further configured to control the transceiver to transmit the first notification message to devices in the trusted list that are active and accessible by the device based on the information in the trusted list.

10. The apparatus of claim 1, wherein the at least one processor is further configured to control the display to display the notification according to a user setting.

11. A method for sharing notifications between devices, the method comprising:
receiving, by an apparatus, a first notification message from a first device included in a list of trusted devices, the list of trusted devices including a plurality of devices;
determining, by the apparatus, whether the first notification message corresponds to a predetermined network event;
when the first notification message does not correspond to the predetermined network event, perform a predetermined operation corresponding to the first notification message;
when the first notification message corresponds to the predetermined network event, determining a current state of the apparatus and a current state of a second device included in the list of trusted devices;
when the first notification message corresponds to the predetermined network event and the apparatus is determined to be in an active state, displaying a notification associated with the first notification message on a display of the apparatus and transmitting the first notification message received from the first device to the second device based on the information included in the first notification message and the current state of the second device; and
when the first notification message corresponds to the predetermined network event and the apparatus is determined to be in an inactive state, transmitting, by the apparatus, the first notification message received from the first device to the second device based on information included in the first notification message and the current state of the second device,
wherein the first device or the second device is at least one of a portable device, a mobile phone, a tablet, a laptop, a non-portable device, a television, a set-top box, or a desktop computer,
wherein the predetermined network event is at least one of a telephone call, a data message, a text message, an e-mail message, a notification from an online service, a calendar event, an appointment, or a reminder, and
wherein the predetermined network event is specified by a user.

12. The method of claim 11, further comprising:
transmitting a registration request including at least one of:
a unique ID of the apparatus, address information of the apparatus,
types of network events for which corresponding messages are or are not to be transmitted to the apparatus, and
information about devices from which notification messages should be transmitted to the apparatus; and
receiving a trusted list of devices in response to the registration request.

13. The method of claim 12, wherein the trusted list of devices includes, for each device in the trusted list, at least one of:
a unique ID of that device,
address information of that device,
types of network events for which corresponding notification messages are or are not to be transmitted to that device, and
devices which should transmit notification messages to that device.

14. The method of claim 11, further comprising:
when a network event occurs at the apparatus, transmitting a second notification message corresponding to the network event occurring at the apparatus to one or more devices accessible by the apparatus and included in a trusted list.

15. The method of claim 11, wherein the trusted list of devices includes, for each device in the trusted list, a list of types of notification messages to be sent to that device.

16. The method of claim 12, wherein the displaying of the notification comprises displaying the notification according to a user setting.

17. A server, comprising:
a transceiver configured to communicate with a plurality of devices; and
at least one processor configured to:
receive a first registration request associated with the first device from a first device,
receive a second registration request associated a second device from a first device,
add at least one of the first device and the second device associated with the first registration request and the second registration request, respectively, to a trusted list of devices, and
transmit an updated trusted list of devices to the first device,
wherein the updated trusted list of devices includes information associated only with devices accessible by the first device,
wherein the first device receives the second registration request from the second device before the first device transmits the second registration request to the server,
wherein the first device determines whether to transmit a first notification message associated with a first network event received at the first device based on whether the first network event corresponds to a predetermined network event and a current status of a device based on the updated trusted list of devices,
wherein the first device or the second device is at least one of a portable device, a mobile phone, a tablet, a laptop, a non-portable device, a television, a set-top box, or a desktop computer,
wherein the first network event is at least one of a telephone call, a data message, a text message, an e-mail message, a notification from an online service, a calendar event, an appointment, or a reminder, and
wherein the first network event is specified by a user.

18. The server of claim 17,
wherein at least one of the first registration request and the second registration request includes at least one of:
a unique ID of the device transmitting the first registration request or the second registration request,
address information of the first device,
address information of the second device,
types of network events for which corresponding messages are or are not to be transmitted to the first device,
types of network events for which corresponding messages are or are not to be transmitted to the second device,
information about devices from which notification messages should be transmitted to the first device, and
information about devices from which notification messages should be transmitted to the second device, and
wherein the trusted list of devices includes, for each device in the trusted list, at least one of:
a unique ID of that device,
address information of that device,
types of network events for which corresponding notification messages are or are not to be transmitted to that device, and
devices which should transmit notification messages to that device.

19. The server of claim 17, wherein the at least one processor is further configured to:
receive a second notification message associated with a second network event, and
control the transceiver to transmit the second notification message associated with the second network event to a device not included in the updated trusted list of devices.

20. The server of claim 17, wherein the at least one processor is further configured to control the transceiver to transmit the trusted list of devices on a regular basis or when the trusted list is updated.

21. The server of claim 17, wherein the at least one of the first device and the second device is added to the trusted list of devices based on authentication information contained in the first registration message or the second registration message, respectively.

* * * * *